(12) United States Patent
Okamoto et al.

(10) Patent No.: US 7,668,795 B2
(45) Date of Patent: Feb. 23, 2010

(54) DATA ANALYZER UTILIZING THE SPREADING ACTIVATION THEORY FOR STEMMING PROCESSING

(75) Inventors: Hiroshi Okamoto, Kanagawa (JP); Yukihiro Tsuboshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 740 days.

(21) Appl. No.: 11/212,629

(22) Filed: Aug. 29, 2005

(65) Prior Publication Data

US 2006/0112027 A1    May 25, 2006

(30) Foreign Application Priority Data

| Nov. 2, 2004 | (JP) | ............................ 2004-318884 |
| Feb. 21, 2005 | (JP) | ............................ 2005-044725 |
| Feb. 28, 2005 | (JP) | ............................ 2005-054502 |

(51) Int. Cl.
*G06N 5/02* (2006.01)
(52) U.S. Cl. ............................... 706/48; 706/25; 707/5; 707/10
(58) Field of Classification Search .................. 706/14, 706/15, 19, 25, 48; 700/32; 434/156, 169; 707/3, 5, 10, 101; 715/716
See application file for complete search history.

(56) References Cited

U.S. PATENT DOCUMENTS

| 5,195,170 | A | * | 3/1993 | Eberhardt ..................... 706/19 |
| 5,486,996 | A | * | 1/1996 | Samad et al. ................. 700/32 |
| 5,634,087 | A | * | 5/1997 | Mammone et al. ............ 706/25 |
| 5,845,285 | A | * | 12/1998 | Klein .......................... 707/101 |
| 6,353,444 | B1 | * | 3/2002 | Katta et al. .................. 715/716 |
| 6,453,315 | B1 | * | 9/2002 | Weissman et al. .............. 707/5 |
| 6,910,025 | B2 | * | 6/2005 | Cao ............................ 706/15 |

(Continued)

OTHER PUBLICATIONS

The convergence and parameter relationship for discrete-time continuous-state Hopfield networks Feng, G.; Douligeris, C.; Neural Networks, 2001. Proceedings. IJCNN '01. International Joint Conference on vol. 1, Jul. 15-19, 2001 pp. 376-381 vol. 1 Digital Object Identifier 10.1109/IJCNN.2001.939049.*

(Continued)

*Primary Examiner*—David R Vincent
*Assistant Examiner*—Ola Olude-Afolabi
(74) *Attorney, Agent, or Firm*—Oliff & Berridge, PLC

(57) ABSTRACT

A data analyzer stores data values at any one of N stages while associating the data values with a plurality of data elements respectively and stores association weighting information among the data elements, selects one of the data elements as a target data at random and computes an input stimulus value concerned with the target data on the basis of the association weighting information between the target data and the other data elements and the data values of the other data elements, and updates the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed.

16 Claims, 9 Drawing Sheets

U.S. PATENT DOCUMENTS

| | | | |
|---|---|---|---|
| 7,051,029 B1* | 5/2006 | Fayyad et al. | 707/10 |
| 7,089,218 B1* | 8/2006 | Visel | 706/14 |
| 2002/0138455 A1* | 9/2002 | Abdel-Moneim et al. | 706/15 |
| 2003/0140020 A1* | 7/2003 | Chen et al. | 706/15 |
| 2004/0058301 A1* | 3/2004 | Glenberg et al. | 434/156 |

OTHER PUBLICATIONS

Hysteresis compensation for giant magnetostrictive actuators using dynamic recurrent neural network, Shuying Cao; Boweng Wang; Jiaju Zheng; Wenmei Huang; Ling Weng; Weili Yan; Magnetics, IEEE Transactions on vol. 42, Issue 4, Apr. 2006 pp. 1143-1146, Digital Object Identifier 10.1109/TMAG.2006.871464.*

A Transiently Chaotic Neural Network with Hysteretic Activation Function for the Shortest Path Problem, Wang, Xiuhong; Qiao, Qingli; Natural Computation, 2008. ICNC '08. Fourth International Conference on vol. 3, Oct. 18-20, 2008 pp. 559-563 Digital Object Identifier 10.1109/ICNC.2008.664.*

The hysteretic Hopfield neural network, Bharitkar, S.; Mendel, J.M.; Neural Networks Proceedings, 1998. IEEE World Congress on Computational Intelligence. The 1998 IEEE International Joint Conference on vol. 2, May 4-9, 1998 pp. 1634-1639 vol. 2, Digital Object Identifier 10.1109/IJCNN.1998.686023.*

A Quickly Searching Algorithm for Optimization Problems Based on Hysteretic Transiently Chaotic Neural Network, Xiuhong Wang1 and Qingli Qiao2, D. Liu et al. (Eds.): ISNN 2007, pp. 72-78, 2007.*

Mark S. Goodman et al.; "Robust Persistent Neural Activity in a Model Integrator with Multiple Hysteretic Dendrites per Neuron"; Cerebral Cortex; vol. 13, No. 11; pp. 1185-1195; Nov. 2003.

J.J. Hopfield; "Neural networks and physical systems with emergent collective computational abilities"; *Proc. Natl. Acad. Sci. USA*; vol. 79; pp. 2554-2558; Apr. 1982.

Alexei A. Koulakov et al.; "Model for a robust neural integrator"; *nature neuroscience*; vol. 5, No. 8; pp. 775-782; Aug. 2002.

* cited by examiner

FIG. 2A
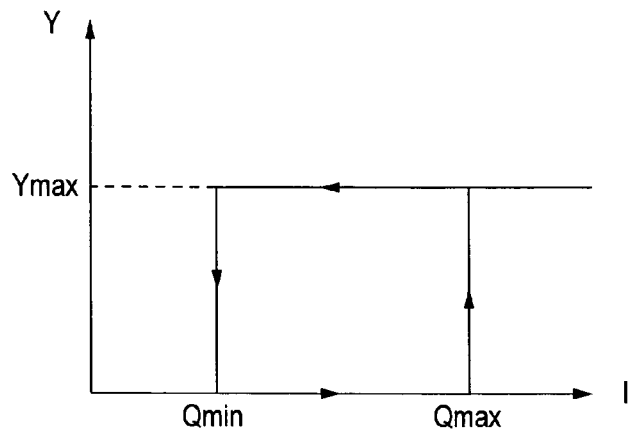
FIG. 2B
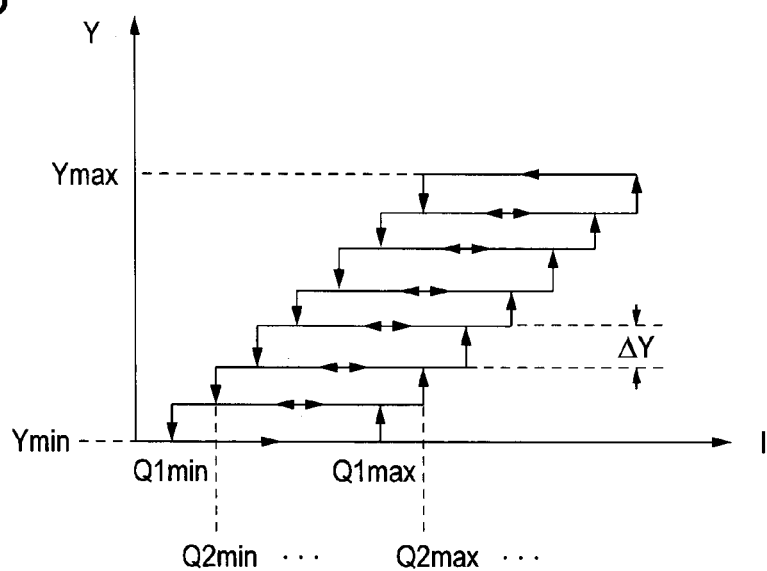
FIG. 3
| INFORMATION FOR SPECIFYING DATA ELEMENT | DATA VALUE |
|---|---|
| aaaa | xxxx |
| bbbb | yyyy |
| ⋮ | ⋮ |

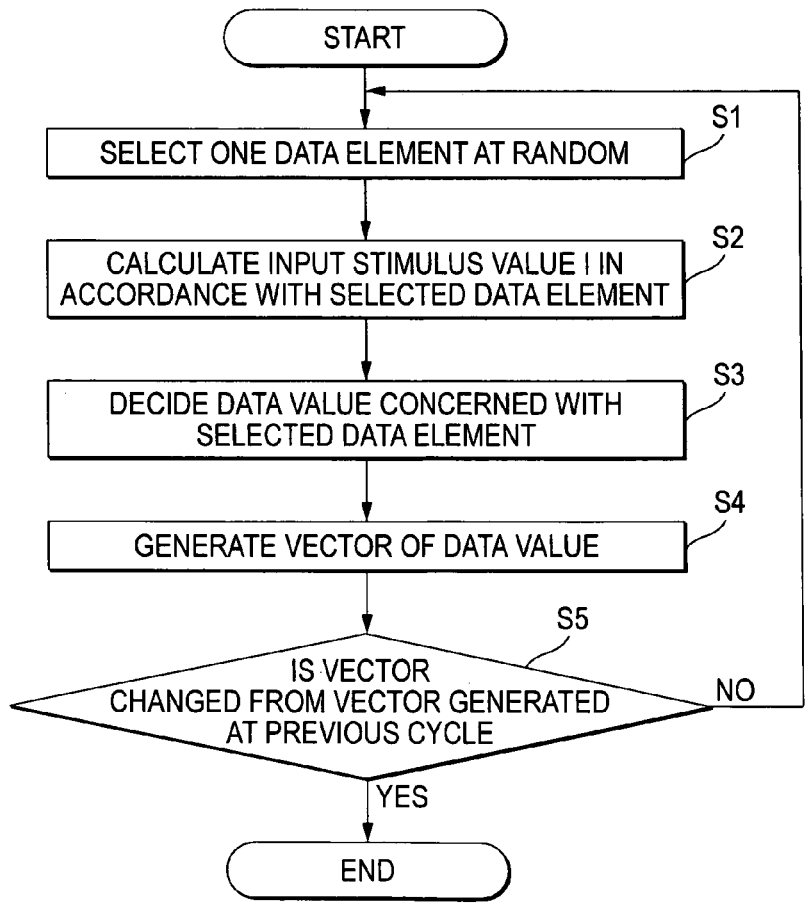

FIG. 8A

SIGNIFICANCE

| AUTISM | 0.271186 |
|---|---|
| HISTOR | 0.256563 |
| AUTIST | 0.25116 |
| TODAY | 0.243928 |
| TERM | 0.240289 |
| DIAGNOST | 0.233665 |
| BACKGROUND | 0.213485 |
| SHILD | 0.205281 |
| IMPLIC | 0.188907 |
| BRIEF | 0.18038 |

FIG. 8B

DATA VALUE AFTER ACTIVE PRORAGATION

| CHILD | 0.069926 |
|---|---|
| AUTISM | 0.0667454 |
| AUTIST | 0.0506647 |
| PSYCH | 0.0493691 |
| EMOTION | 0.0485704 |
| INFANTIL | 0.0485322 |
| MENT | 0.0419347 |
| SCHIZOPHREN | 0.0354878 |
| DISTURB | 0.0324395 |
| BEHAVIOR | 0.0316383 |

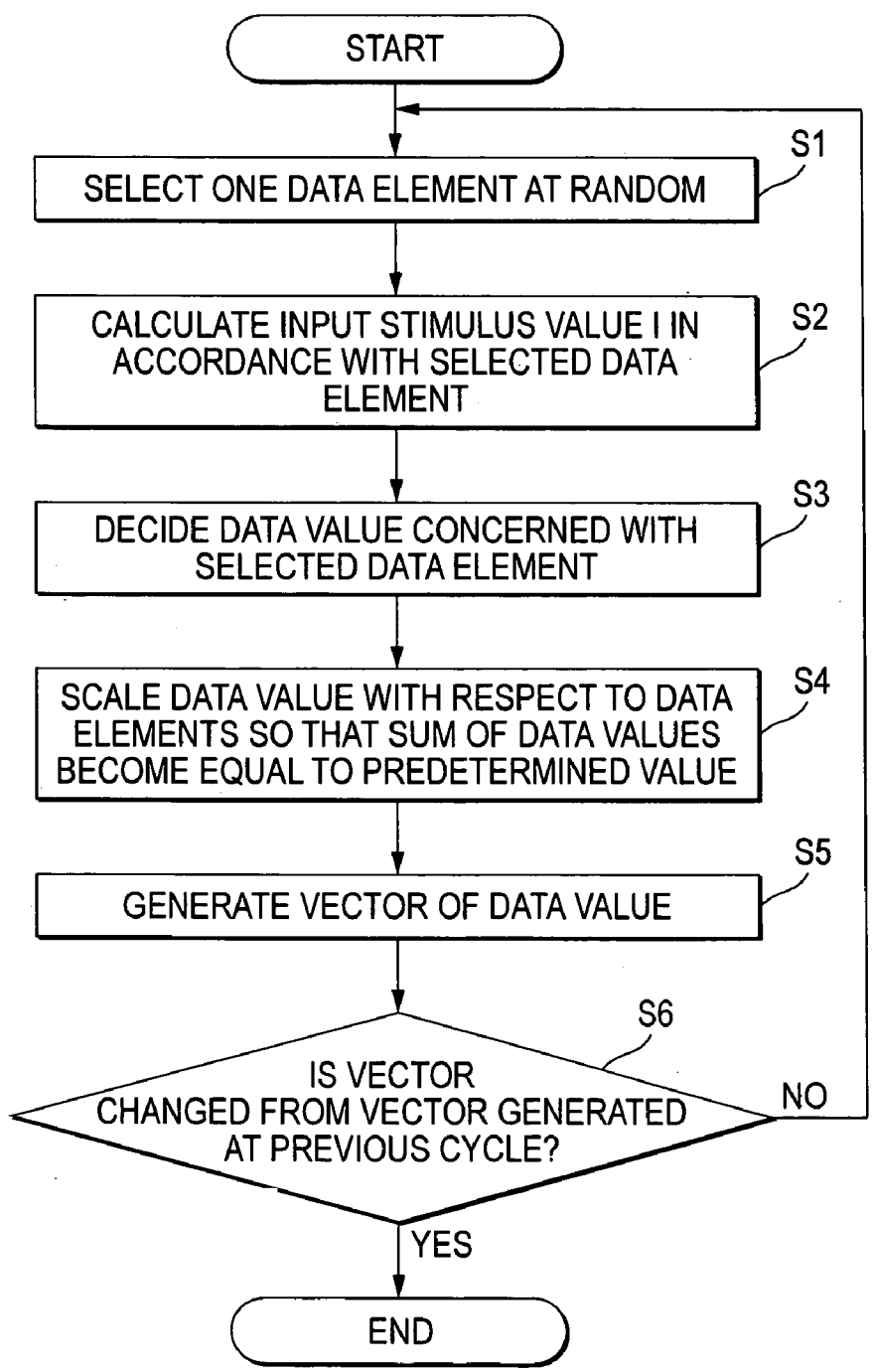

FIG. 10

| INFORMATION FOR SPECIFYING DATA ELEMENT | CORRESPONDENCE INFORMATION | |
| --- | --- | --- |
| | QUOTING | QUOTED |
| aaaa | bbbb, cccc . . . | dddd |
| bbbb | | aaaa |
| ⋮ | ⋮ | ⋮ |

FIG. 11

| | aaaa | bbbb | . . . |
| --- | --- | --- | --- |
| aaaa | 0 | $T_{11}$ | . . . |
| bbbb | | 0 | . . . |
| ⋮ | | | ⋮ |

DATA ANALYZER UTILIZING THE SPREADING ACTIVATION THEORY FOR STEMMING PROCESSING

BACKGROUND OF THE INVENTION

1. Field of the Invention

The present invention relates to a data analyzer using a neural network.

2. Description of the Related Art

Several methods have been heretofore known as data analyzing methods of the type using a neural network. Of these, a method proposed by J. J. Hopfield includes the steps of: defining bond strengths among a plurality of nodes; and judging which of predetermined patterns a pattern including one of the nodes is closest to.

Bond strengths among nodes are set here so that the bond strength from a node i to a node j is equal to the bond strength from the node j to the node i to thereby become so-called symmetrical bond. It is known that active propagation in a network (symmetrical bond network) constituted by such nodes results in settling into a specific stable state (a fixed point which is an attractor of a dynamical system decided by active propagation). That is, the method proposed by Hopfield is a method for computing which fixed point pattern (of predetermined patterns) the initial pattern of the network is closest to, in accordance with which stable state (fixed point) the network finally settles into (Hopfield, J. J. (1982) Proc. Natl. Acad. Sci. USA, 79, 2554).

SUMMARY OF THE INVENTION

In the background art method proposed by Hopfield, however, a result of network analysis is any one of fixed point patterns which are decided in advance. These fixed point patterns are discrete in a solution space. There is a problem that a solution continuously changing cannot be obtained though the initial pattern changes.

Therefore, an attempt to achieve a dynamic system having continuous attractors has been made in such a manner that a network is constituted by hysteresis units (units having hysteresis characteristic in terms of value change) (Koulakov, A. A., Raghavachari, S., Kepecs, A. & Lisman, J. E. (2002), Nat. Neuro Sci. 8, 775). In the method proposed by Koulakov et al, it is however impossible to achieve any continuity of patterns except continuity concerned with scalars (also referred to as activities) defined on the basis of the whole of the network.

That is, a method for giving a solution having continuity in accordance with an initial pattern state has not been found yet in a network made from a group of data elements to be analyzed. For this reason, each of the background-art methods can be only used in data analysis for restricted purposes.

According to the recent brain science's knowledge, it is said that input-output characteristic of each real neuron is achieved by multistageous lamination of hysteresis patterns. However, there has been found no method for actually applying this knowledge to data processing in a neural network.

The invention is provided upon such circumstances and provides a data analyzer which can give a solution having continuity in accordance with an initial pattern state in a network made from a group of data elements to be analyzed so that the data analyzer can be used for wide purposes.

Also, the invention provides a data analyzer improved in network convergence.

Further, the invention provides a data analyzer lightened in load of arithmetic operations.

The invention provides a data analyzer including: a storage unit that stores data values at any one of N stages (N is an integer not smaller than 2) while associating the data values with a plurality of data elements respectively and stores association weighting information among the data elements; a selecting and computing unit that selects one of the data elements as a target data on the basis of a predetermined rule and computes an input stimulus value concerned with the target data on the basis of the association weighting information between the target data and the other data elements and the data values of the other data elements; and an updating unit that updates the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed; wherein after repeating execution of computing of the input stimulus value and updating of the data value until satisfaction of a predetermined condition, the data value concerned with at least one of the data elements is subjected to a predetermined process.

Further, the invention provides a data analyzer including: a storage unit that stores data values as continuous values in a range of from Ymin to Ymax (Ymin<Ymax) while associating the data values with a plurality of data elements respectively and stores association weighting information among the data elements; a selecting and computing unit that selects one of the data elements as a target data on the basis of a predetermined rule and computes an input stimulus value concerned with the target data on the basis of the association weighting information between the target data and the other data elements and the data values of the other data elements; and an updating unit that updates the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed; wherein after repeating execution of computing of the input stimulus value and updating of the data value until satisfaction of a predetermined condition, the data value concerned with at least one of the data elements is subjected to a predetermined process.

Furthermore, the invention provides a data analyzing method using a computer having a storage unit that stores data values as discrete or continuous values at a plurality of stages while associating the data values with a plurality of data elements respectively and stores association weighting information among the data elements, the method including the steps of: selecting one of the data elements as a target data on the basis of a predetermined rule and computing an input stimulus value concerned with the target data on the basis of the association weighting information between the target data and the other data elements and the data values of the other data elements; and updating the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed; wherein the steps are repeatedly executed until a predetermined condition is satisfied; and after the repeated execution, the data value concerned with at least one of the data elements is subjected to a predetermined process.

Also, the invention provides a storage medium readable by a computer, the storage medium storing a program of instructions executable by the computer having a storage unit that stores data values as discrete or continuous values at a plurality of stages while associating the data values with a plurality of data elements respectively and stores association weighting information among the data elements, the function including the steps of: selecting one of the data elements as a target data on the basis of a predetermined rule and computing an input stimulus value concerned with the target data on the basis of the association weighting information between the target data and the other data elements and the data values of the other data elements; and updating the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed.

Also, the invention provides a data analyzer including: a storage unit that stores data values as continuous values in a range of from Ymin to Ymax (Ymin<Ymax) while associating the data values with at least a part of data elements respectively and stores association weighting information among the data elements; a regarding unit that regards at least one of the data elements as a seed and selects the seed and at least one of the other data elements different from the seed as subjects of computation; a selecting and computing unit that selects one of the selected subjects of computation as a target data on the basis of a predetermined rule and computes an input stimulus value concerned with the target data on the basis of information of association weighting between the target data and the data elements selected as the subjects of computation and the respective data values of the data elements selected as the subjects of computation; and an updating unit that updates the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed; wherein after repeated execution of computing of the input stimulus value and updating of the data value until satisfaction of a predetermined condition, the data value concerned with at least one of the data elements is subjected to a predetermined process.

Additionally, the invention provides a data analyzing method using a computer having a storage unit that stores data values as continuous values in a range of from Ymin to Ymax (Ymin<Ymax) while associating the data values with at least a part of data elements respectively and stores association weighting information among the data elements, the d method including the steps of: regarding at least one of the data elements as a seed and selecting the seed and at least one of the other data elements different from the seed as subjects of computation; selecting one of the selected subjects of computation as a target data on the basis of a predetermined rule and computing an input stimulus value concerned with the target data on the basis of information of association weighting between the target data and the data elements selected as the subjects of computation and the respective data values of the data elements selected as the subjects of computation; and updating the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed; wherein after repeated execution of computing of the input stimulus value and updating of the data value until satisfaction of a predetermined condition, the data value is output.

Further, the invention provides a storage medium readable by a computer, the storage medium storing a program of instructions executable by the computer having a storage unit that stores data values as continuous values in a range of from Ymin to Ymax (Ymin<Ymax) while associating the data values with at least a part of data elements respectively and stores association weighting information among the data elements, the function including the steps of: regarding at least one of the data elements as a seed and selecting the seed and at least one of the other data elements different from the seed as subjects of computation; selecting one of the selected subjects of computation as a target data on the basis of a predetermined rule and computing an input stimulus value concerned with the target data on the basis of association weighting information between the target data and the data elements selected as the subjects of computation and the respective data values of the data elements selected as the subjects of computation; and updating the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed; wherein computing of the input stimulus value and updating of the data value are repeatedly executed until satisfaction of a predetermined condition.

Furthermore, the invention provides a data analyzer including: a storage unit that stores data values while associating the data values with at least a part of data elements respectively and stores association weighting information among the data elements; a selecting and computing unit that selects one of the data elements as a target data on the basis of a predetermined rule and computes an input stimulus value concerned with the target data on the basis of association weighting information among the target data and the data elements selected as the subjects of computation and the respective data values of the data elements selected as the subjects of computation; and an updating unit that updates the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed; wherein after repeated execution of computing of the input stimulus value and updating of the data value until satisfaction of a predetermined condition, a relative distance between data elements is decided on the basis of the data value concerned with at least one of the data elements so that graphic elements corresponding to the data elements respectively are arranged so as to be separate by the decided relative distance and displayed.

BRIEF DESCRIPTION OF THE DRAWINGS

Embodiments of the present invention will be described in detail based on the following figures, wherein:

FIGS. 2A and 2B are explanatory graphs showing an example of a method for updating a data value in accordance with each data element;

FIG. 3 is an explanatory view showing an example of the contents of an element database;

FIG. 4 is an explanatory view showing an example of the contents of an association weighting database;

FIG. 5 is a flow chart showing an example of a process of active propagation;

FIGS. 8A and 8B are explanatory views showing another example of operation of the data analyzer according to the embodiment of the invention;

FIG. 9 is a flow chart showing a process of active propagation according to a second embodiment of the invention;

FIG. 10 is an explanatory view showing an example of information for defining a network between data elements according to a third embodiment of the invention;

FIG. 11 is an explanatory view showing an example of contents of an association weighting database;

DETAILED DESCRIPTION OF THE INVENTION

First Embodiment

Figure 1:
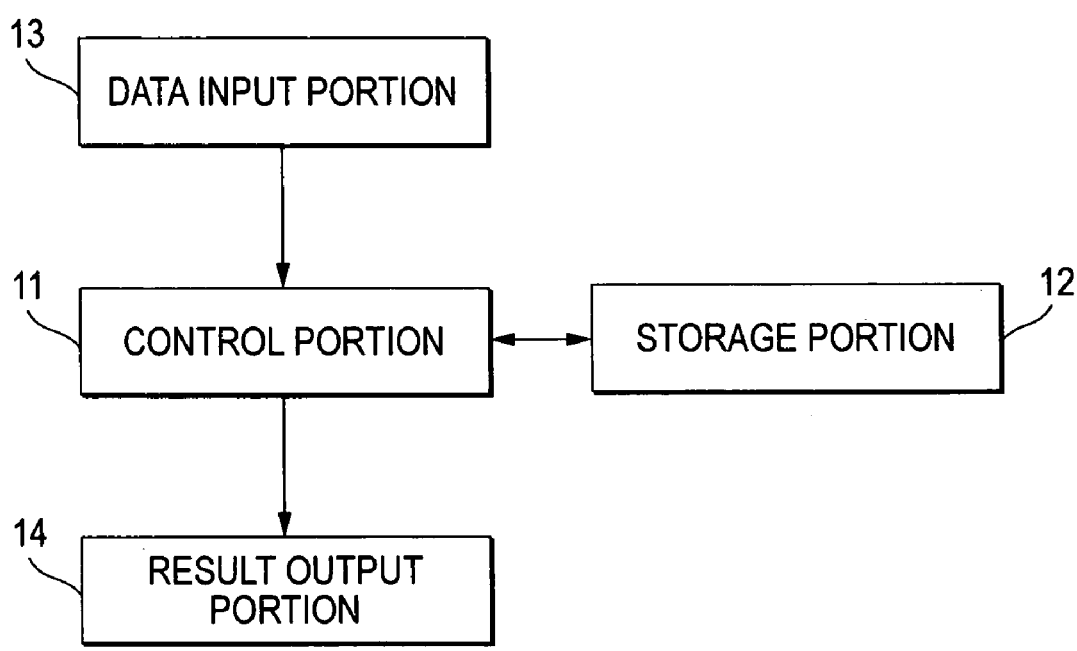
FIG. 1 is a configuration block diagram of a data analyzer according to a first embodiment of the invention.

Embodiments of the invention will be descried with reference to the drawings. As shown in FIG. 1, a data analyzer according to a first embodiment of the invention includes a control portion 11, a storage portion 12, a data input portion 13, and a result output portion 14.

The control portion 11 can be implemented by a CPU or the like. The control portion 11 executes a data analyzing process in accordance with a program stored in the storage portion 12. Specific contents of the process executed by the control portion 11 will be described later in detail. The storage portion 12 can be implemented by use of a memory element or a disk device. The storage portion 12 stores the program executed by the control portion 11. The storage portion 12 serves also as a work memory for storing various data used in the data analyzing process executed by the control portion 11.

The data input portion 13 and the result output portion 14 are input-output interfaces for acquiring data, for example, from a data storage in which data to be analyzed are stored, and outputting a result of analysis to the data storage or a display or the like.

Next, the data analyzing process executed by the control portion 11 in this embodiment will be described. In this embodiment, a mutual bond network type data structure is defined, so that data value storage units having multistage hysteresis input-output characteristic are associated with nodes respectively. In this embodiment, the data to be analyzed includes a plurality of data elements. Assuming specifically that the data to be analyzed is a sentence, then the data elements can be defined as individual words.

The multistage hysteresis input-output characteristic of each node is as follows. First, simple hysteresis characteristic (independent hysteresis characteristic) is formed so that a data value Y takes either Y=0 or Ymax as shown in FIG. 2A. A lower threshold Qmin and an upper threshold Qmax are determined. If the data value Y is initialized to "0" at an initial state, the state of "0" is kept until the input I exceeds the upper threshold Qmax. If the input I exceeds the upper threshold Qmax, the data value Y takes Ymax. While the input I is larger than the lower threshold Qmin after that, the value of Ymax is held. If the input I is not larger than the upper threshold Qmin, the data value Y takes "0".

Multistage hysteresis is a multistageous laminate of independent hysteresis characteristics. Specifically, in the multistage hysteresis, each node takes any one of N-stages' values in a range of from Y=0 to Y=Ymax. Specifically, as shown in FIG. 2B, a lower threshold Qmin and an upper threshold Qmax are decided in accordance with each stage.

In the case (Q1max<I<Q2max) where the input is larger than the upper threshold Q1max at the first stage but not larger than the upper threshold Q2max at the second stage in the condition that the data value is reset to "0", the output at the first stage takes Y=Ymax/N. If the input I then changes to a value lower than the lower threshold Q1min at the first stage, the data value Y takes "0".

In the case (Q2max<I<Q3max) where the input I is larger than the upper threshold Q2max at the second stage but not larger than the upper threshold Q3max at the third stage in the condition that the data value is Y=Ymax/N, the data value Y takes Y=2×Ymax/N as a value at the second stage.

As shown in FIG. 3, the control portion 11 generates an element database while associating information (e.g. character strings of words) for specifying data elements respectively with the data values and stores the element database in the storage portion 12. As shown in FIG. 4, the control portion 11 generates an association weighting database having an association weighting value decided in accordance with each pair of data elements and stores the association weighting database in the storage portion 12. In the example shown in FIG. 4, values to be set in the lower triangular portion are omitted because the lower triangular portion can be set by folding the upper triangular portion back at the diagonal line (i.e. Tij=Tji).

Moreover, in this embodiment, lower thresholds and upper thresholds at the respective stages are stored in the storage portion 12 for deciding the multistage hysteresis characteristic.

The control portion 11 performs the data analyzing process on the basis of the information stored in the storage portion 12. In this embodiment, such hysteresis units are associated with nodes in the mutual bond network so that active propagation is performed by a "dynamic system" decided by the following steps. In the network made from the data value storage units according to this embodiment, attractors (fixed point states) obtained by the active propagation depend on the initial state continuously.

The process of active propagation in the control portion 11 will be described below with reference to FIG. 5. A data element is selected as a target data based on a predetermined rule from a number (M) of data elements included in the data to be analyzed (S1). For example, this rule (selecting rule) is a rule of selecting a data element at random. Assume now that the i-th data element is selected. An input stimulus value required to update a data value associated with the target data is computed in accordance with the expression 1 (S2):

$$I_i = \sum_{j=1}^{N} T_{ij} O_j \quad \text{[Expression 1]}$$

in which Tij is an association weighting value indicating association weighting between the i-th data element and the j-th data element and read from the association weighting database, and Oj is a data value associated with the j-th data element and stored in the element database.

Then, a data value associated with the i-th data element as the target data is decided (S3) and the element database is updated. Specifically, in this embodiment, the data value is decided as follows.

That is, examination is made as to which stage value n of multistage values the data value associated with the target data is. Assuming that the data value changes by Ymax/N=ΔY each stage, then the value n at each stage can be calculated as a value obtained by dividing the data value by ΔY (i.e. n is calculated by dividing Y by ΔY because Y=n×ΔY). Then, a lower threshold θmin and an upper threshold θmax corresponding to the obtained stage are acquired.

The upper threshold θmax is compared with the input stimulus value I computed by the step S2. In the case of I>θmax, the data value Y is updated to (n+1)×ΔY and the step S3 is executed recursively. Incidentally, in the uppermost stage Y=Ymax, the upper threshold is set to be larger than the maximum input stimulus value so that the data value is never larger than the maximum. On the other hand, the lower threshold θmin is compared with the input stimulus value I. In the case of I≦θmin, the data value Y is updated to (n−1)×ΔY and the step S3 is executed recursively. Also on this occasion, in the lowermost stage Y=Ymin, the lower threshold is set to be smaller than the minimum input stimulus value so that the data value is never smaller than the minimum.

In the case of θmin<I<θmax, the current position of this routine goes to step S4. After the data value associated with the target data is updated in this manner, a vector defined as a set of data values concerned with the respective data elements is generated (S4). While the vector generated in the previous cycle is stored in the storage portion 12, the difference between the vector generated in the previous cycle and the vector generated in the present cycle is calculated. A judgment is made as to whether the vector of the calculated difference is a zero vector (with all elements of "0") or not (S5). When the vector is not a zero vector (S5: No), the current position of this routine goes back to the step S1 to repeat this routine. On this occasion, after updating of the switch information, a judgment is made as to whether the data value associated with each data element becomes unchanged or not. The current position of this routine returns to the step S1 while the data value changes.

$$\overline{O} = (O_1 \ O_2 \ \ldots \ O_N) \quad \text{[Expression 2]}$$

$$\underbrace{(0, 0, \ldots, 0)}_{N} \quad \text{[Expression 3]}$$

When a decision is made in the step S5 that the vector of the calculated difference is a zero vector (S5: Yes), this routine is terminated. A set of information for specifying the data element stored in the element database and the data value at this time is used as a result of analysis subjected to a predetermined process which will be performed later. Incidentally, the state stored in the element database expresses an equilibrium state in input-output balance of each data element (i.e. an attractor in a dynamic system). This state is equivalent to a state called "fixed point".

In the computation in the step S3 described above, it is necessary to execute an arithmetic process recursively. That is, this is because the data value may change by the multistage's value. When the data value changes over the plurality of stages as described above, the control portion 11 repeats comparison between the threshold and the input stimulus value. If the number N of stages is increased, the computing speed is reduced. Therefore, in this embodiment, in place of setting data values discretely in N stages, the data values are regarded as continuous values on the assumption that N is infinite. On this occasion, the continuous values are expressed as discrete data in terms of representation in the inside of the computer but are called "continuous values" in terms of non-stageous values theoretically.

Figure 6:
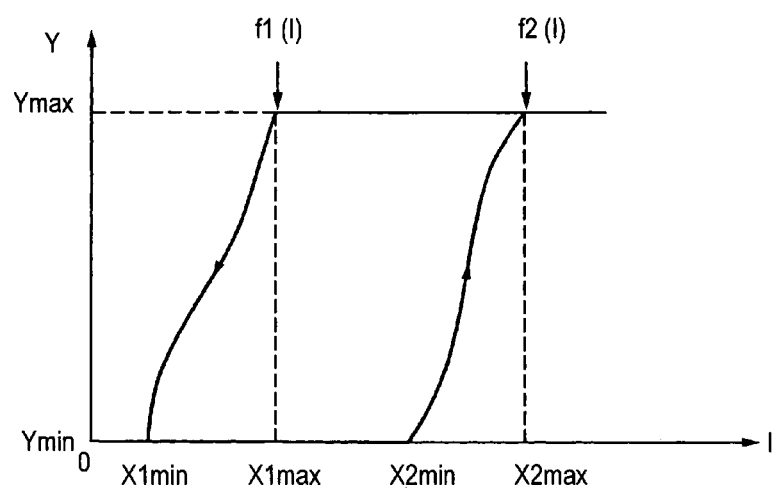
FIG. 6 is an explanatory view showing an example of a method for updating data values.

As shown in FIG. 6, in the case of continuous values, each data value is updated by use of a first monotonically increasing function f1 and a second monotonically increasing function f2. In the first monotonically increasing function f1, the data value takes Ymin when the input stimulus value is in a range of from 0 to Xmin, increases continuously monotonically when the input stimulus value is in a range of from X1min to X1max, and takes Ymax when the input stimulus value is not smaller than X1max. In the second monotonically increasing function f2, the data value increases continuously monotonically when the input stimulus value is in a range of from X2min to X2max, and takes Ymax when the input stimulus value is not smaller than X2max. That is, the data value is updated as follows.

(1) When the input stimulus value I for the target data is larger than X2max, that is, in the case of X2max<I, the data value Y becomes equal to Ymax.

(2) When the input stimulus value I for the target data is not larger than X1min, that is, in the case of I<X1min, the data value Y becomes equal to Ymin.

(3) When the input stimulus value I for the target data is in a range of from X1min to X2max, that is, in the case of X1min<I≦X2max, the data value is updated to f2 (I) when the input stimulus value I is larger than I2 by referring to I2 satisfying Y=f2 (I2) with respect to the data value Y for the target data before updating, and the data value is updated to f1 (I) when the input stimulus value I is smaller than I1 by referring to I1 satisfying Y=f1 (I1) with respect to the data value Y for the target data before updating.

Here the first and second monotonically increasing functions f1 and f2 are defined as the expressions 4:

$$Y = f_1(I) = \alpha(I - X_{1min})$$

$$Y = f_2(I) = \alpha(I - X_{2min}) \quad \text{[Expression 4]}$$

On this occasion, respective solutions of Y=f2 (I2) and Y=f2 (I1) with respect to I2 and I1 are obtained as the expressions (5):

$$I = \frac{Y}{\alpha} + X_{1min} \qquad \text{[Expression 5]}$$

$$I = \frac{Y}{\alpha} + X_{2min}$$

Accordingly, the process of updating the data value is performed as follows.

(1) When the input stimulus value I for the target data is larger than X2max, that is, in the case of X2max<I,
the data value Y becomes equal to Ymax.

(2) When the input stimulus value I for the target data is not larger than X1min, that is, in the case of I≦X1min,
the data value Y becomes equal to Ymin.

(3) When the input stimulus value I for the target data is in a range of from X1min to X2max, that is, in the case of X1min<I≦X2max,
the data value is updated to f2(I)=α(I−X2min) when the input stimulus value I is larger than Y/α+X2min with respect to the data value Y for the target data before updating, and
the data value is updated to f1(I)=α(I−X1min) when the input stimulus value I is smaller than Y/α+X1min with respect to the data value Y for the target data before updating.

According to this method, the number of judging processes can be limited, so that the quantity of calculation can be reduced.

Next, the operation of the data analyzer according to this embodiment will be described. The case where an ordinary document retrieval process for retrieving a document containing a required keyword from a document group and an analogous document retrieval process for retrieving an analogous document analogous to a key document from the document group are executed is taken as an example here.

Before these processes, first, the document group to be searched is subjected to the following process. That is, the control portion 11 takes data of the document group stored in a storage not shown through the data input portion 13 and extracts a number Q of index words w1, w2, . . . , wQ from each of a number P of documents D1, D2, . . . , DP. The extraction of the index words is performed in such a manner that predetermined general words (i.e. so-called stop words) are removed from a word group contained in each document and a stemming process (for taking out the stems of words by removing inflections and declensions from the words) is performed. Incidentally, the stemming process is a process in which words such as "child", "childhood", "children", etc. are regarded as the same word "child" in consideration of inflections and declensions.

The significance dij of each index word wi in each document Dj is defined by a TFIDF method (Term Frequency Inverse Document Frequency). That is, the significance dij is given by the expression 6:

$$d_{ij} = \log(1 + a_{ij})\log(P/b_i) \qquad \text{[Expression 6]}$$

in which aij expresses the frequency of occurrence of the word wi in the document Dj, bi expresses the number of documents containing the word wi in the whole of the document group, and P expresses the total number of documents in the document group.

Then, while the index words are used as data elements, a storage area (element database) for storing information for specifying the index words and the data values is secured in the storage portion 12. Moreover, an area (association weighting database) for storing association weighting among the index words is secured in the storage portion 12. The association weights are decided on the basis of a co-variant learning rule. That is, words appearing simultaneously in one and the same document are associated with each other so that the bond weight Tij between the words wi and wj is defined as follows.

$$T_{ij} = \frac{\sum_{k=1}^{P}(d_{ik}-m_i)(d_{jk}-m_j)}{\sqrt{\sum_{k=1}^{P}(d_{ik}-m_i)^2}\sqrt{\sum_{k=1}^{P}(d_{jk}-m_j)^2}} \text{ in which} \qquad \text{[Expression 7]}$$

$$m_i = \sum_{j=1}^{P} d_{ij}/P$$

When the ordinary document retrieval process is to be performed, a vector q of the significance of an index word wi contained in a sentence (query sentence) as a key of retrieval is defined by the TFIDF method on the basis of the frequency of occurrence of the index word w contained in the query sentence and the frequency of occurrence of the index word in the document group.

The value of the significance of each index word wi in the query sentence is stored, as an initial value of the data value associated with the corresponding index word, in the element database of the storage portion 12. The control portion 11 performs the process of active propagation shown in FIG. 5. If data values stored in the element database are not updated any more, the control portion 11 reads a combination of the data values as an output (output vector). Incidentally, the vector dj is a vector in which the significances of the respective words are arranged in the j-th document, and the vector q is an output vector after the process of active propagation.

The control portion 11 computes a cosine value concerned with the inner product of the output vector and the combination of the significances of the index words in each document as represented by the expression 8.

$$C(j) = \frac{\overline{d}_j \cdot \overline{q}}{\|\overline{d}_j\| \times \|\overline{q}\|} \qquad \text{[Expression 8]}$$

The documents are arranged in descending order of the cosine value (C(j) in the j-th document) computed in accordance with each document and are presented as a retrieval result to the user through the result output portion 14.

Incidentally, when the analogous document retrieval process is to be performed, the vector q of the significance of the index word wi in a key document may be used in place of the vector q of the significance of the index word wi in a query sentence so that the same process as described above can be performed.

When keywords, key documents, etc. are pre-processed by the process shown in FIG. 5 with respect to the retrieval key in this manner, for example, documents not retrieved by the retrieval key but containing relevant words can be retrieved actually.

In the data analyzer according to this embodiment, a solution having continuity in accordance with the initial pattern state is given in the network made from a group of data elements to be analyzed, because such active propagation is used. For this reason, the network can be used for wide purposes compared with the network in which the result is converged to solutions allowed to be decided discretely in advance.

Example

An example of document retrieval will be described below by use of Medline1033 (which can be obtained from ftp://ftp.cs.cornell.edu/pub/smart/med/ or the like) known as a document group sample in which a retrieval questionnaire and a right answer document to be retrieved by the questionnaire are decided in advance.

Incidentally, for comparison, an example (first example) in which the value of the significance of each index word obtained from a query sentence or a key document by the TFIDF method is directly used without the process of active propagation shown in FIG. 5 and an example (second example) in which active propagation different from that shown in FIG. 5 is performed are shown here in addition to the example according to the invention.

A convergent value of A(t) decided by the expressions (9) with respect to the repetition frequency (active frequency) t is used in the active propagation in the second example. In the second example, as described above, the initial value C of the significance of the index word is always added whenever the repetition frequency advances. The method shown in the second example is a method called "Spreading Activation Theory in ACT* (Active Control of Thought)". In the expressions 9, I is a unit matrix, γ and α are given parameters, and R is a matrix in which association weights are decided (the association weights can be defined on the basis of those in this embodiment). Accordingly, the matrix M is here a matrix for associating the active state of A(t−1) with A(t) in the next generation (the next active frequency).

$$\overline{A}(t) = \overline{C} + M\overline{A}(t-1)$$

$$M = (1-\gamma)I + aR \quad \text{[Expression 9]}$$

Ranks i are successively given to documents concerned with the query sentence or the key document by these methods. A score v is calculated on the basis of the success value Zi (which takes 1 when the given document is a right answer document and which takes 0 when the given document is not a right answer document), the total number R of fit documents and the number n of output documents as follows.

$$v = \frac{1}{R} \sum_{i=1}^{n} \frac{Z_i}{i} \left( 1 + \sum_{k=1}^{i-1} Z_k \right) \quad \text{[Expression 10]}$$

Figure 7:
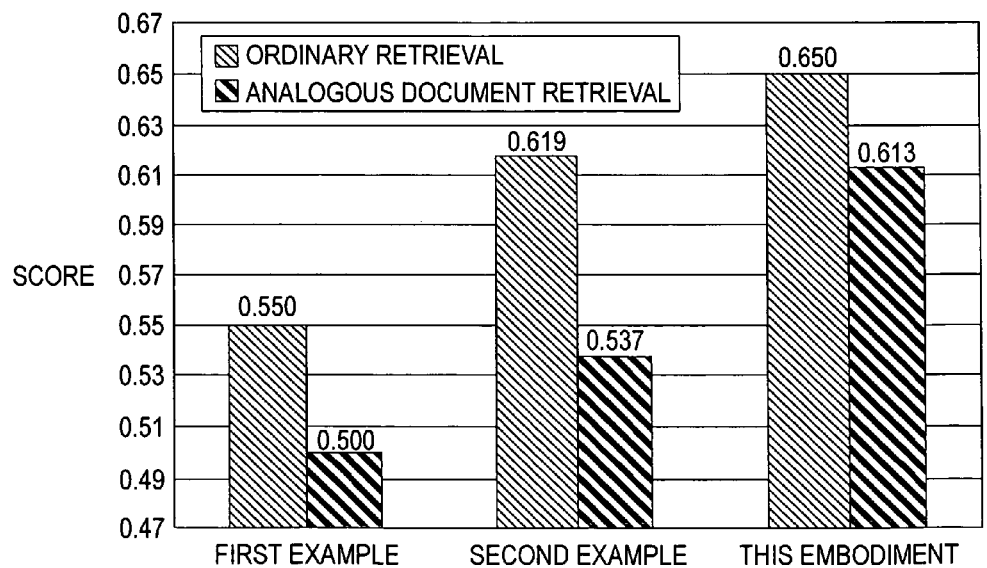
FIG. 7 is an explanatory graph showing an example of operation of the data analyzer according to the embodiment of the invention.

FIG. 7 shows results of the retrieval. In FIG. 7, the ordinary retrieval shows a result of retrieval based on the query sentence, and the analogous document retrieval shows a result of retrieval of analogous documents based on the key document.

According to FIG. 7, the result of this embodiment is not only relatively high in score but also relatively small in the score difference between the ordinary retrieval and the analogous document retrieval compared with those of the first and second examples. It can be confirmed that retrieval accuracy is improved as a whole.

The significances of words concerned with the target document are decided by the TFIDF method and the words are rearranged in order of significance. The values of the significances are used as data values so that the process of active propagation is performed by the data analyzer according to this embodiment. After the process, data are generated as a sequence of data rearranged in descending order of the data value. FIGS. 8A and 8 show a result of the rearrangement. These processes are equivalent to the process of taking out index words for characterizing the target document. The list shown in FIG. 8A little overlaps the list shown in FIG. 8B. Only words contained in the sentence appear in the list shown in FIG. 8A whereas words not contained in the sentence may appear in the list shown in FIG. 8B (if the words are contained in the document group) so that words concerned with the target document can be selected widely.

Second Embodiment

FIG. 9 is a flow chart showing a process of active propagation according to a second embodiment of the invention. This embodiment differs from the first embodiment in that a scaling process (S4 in FIG. 9) is further provided. In the following explanation, elements that are the same as those of the first embodiment are given the same reference numerals.

In the control portion 11, the same processes (S1 to S3) as those in the first embodiment are performed.

The control portion 11 then scales data values with respect to the data elements so that the sum of the data values becomes equal to a predetermined value C (S4). That is, an arithmetic operation is carried out with the i-th data value as Yi, so that the resulting data value Y'i is overwritten in place of the data value Yi and stored in the storage portion 12. Network convergence is improved by this scaling.

$$Y'_i = \frac{CY_i}{\sum_i Y_i} \quad \text{[Expression 11]}$$

After the data value associated with the target data is updated and scaled in this manner, a vector defined as a set of data values concerned with the respective data elements is generated (S5). While the vector generated in the previous cycle is stored in the storage portion 12, the difference between the vector generated in the previous cycle and the vector generated in the present cycle is calculated. A judgment is made as to whether the vector of the calculated difference is a zero vector (with all elements of "0") or not (S6). When the vector is not a zero vector (S6: No), the current position of this routine goes back to the step S1 to repeat this routine. On this occasion, after updating of the switch information, a judgment is made as to whether the data value associated with each data element becomes unchanged or not. The current position of this routine returns to the step S1 while the data value changes.

In this embodiment, scaling of data values (normalization by dividing data values by the sum of the data values and multiplying the quotients by a constant value C to make the sum equal to the constant value C) is carried out in a process of active propagation, so that convergence is improved without spoiling the network structure. Incidentally, if it is judged from initial data values on this occasion that convergence without scaling is higher than convergence with scaling, configuration may be made so that a user can select suitably execution of scaling or non-execution of scaling. When non-execution of scaling is selected by the user, the control portion 11 goes to the step S5 after the step S3 without execution of the step S4 in the process shown in FIG. 9.

Third Embodiment

Now, a third embodiment of the invention will be described. In the following explanation, elements that are the same as those of the first embodiment are given the same reference numerals.

The data analyzing process executed by the control portion 11 in this embodiment will be described. In this embodiment, a mutual bond network type data structure is defined, so that data value storage units having multistage hysteresis input-output characteristic are associated with nodes respectively. In this embodiment, the data to be analyzed includes a plurality of data elements. Assuming specifically that the data to be analyzed is collected articles, then the data elements can be defined as individual articles.

The multistage hysteresis input-output characteristic of each node is as follows. First, simple hysteresis characteristic (independent hysteresis characteristic) is formed so that a data value Y takes either Y=0 or Ymax as shown in FIG. 2A. A lower threshold Qmin and an upper threshold Qmax are determined. If the data value Y is initialized to "0" at an initial state, the state of "0" is kept until the input I exceeds the upper threshold Qmax. If the input I exceeds the upper threshold Qmax, the data value Y takes Ymax. While the input I is larger than the lower threshold Qmin after that, the value of Ymax is held. If the input I is not larger than the upper threshold Qmin, the data value Y takes "0".

Multistage hysteresis is a multistageous laminate of independent hysteresis characteristics. Specifically, in the multistage hysteresis, each node takes any one of N-stages' values in a range of from Y=0 to Y=Ymax. Specifically, as shown in FIG. 2B, a lower threshold Qmin and an upper threshold Qmax are decided in accordance with each stage.

In the case (Q1max<I<Q2max) where the input is larger than the upper threshold Q1max at the first stage but not larger than the upper threshold Q2max at the second stage in the condition that the data value is reset to "0", the output at the first stage takes Y=Ymax/N. If the input I then changes to a value lower than the lower threshold Q1min at the first stage, the data value Y takes "0".

In the case (Q2max<I<Q3max) where the input I is larger than the upper threshold Q2max at the second stage but not larger than the upper threshold Q3max at the third stage in the condition that the data value is Y=Ymax/N, the data value Y takes Y=2×Ymax/N as a value at the second stage.

As shown in FIG. 3, the control portion 11 generates an element database while associating information (e.g. titles of articles) for specifying data elements respectively with the data values and stores the element database in the storage portion 12.

Information for defining a network between the data elements is also stored in the storage portion 12. As shown in FIG. 10, this information is provided to associate information for specifying a data element (e.g. a title of an article) with information for specifying other data elements correspondent to the data element. The correspondence may have directivity. For example, on the assumption that data elements are articles, there are some articles "quoting" other data elements and some articles "quoted" by other data elements on the basis of a quotation relation. Therefore, correspondence is classified into "quoting" and "quoted" so that a target article is stored while the title of the target article or the like is associated with a list of articles quoted by the target article and a list of articles quoting the target article.

As shown in FIG. 11, the control portion 11 further generates an association weighting database for association weighting values set in accordance with each pair of data elements and stores the association weighting database in the storage portion 12. In the example shown in FIG. 11, a lower triangular portion is omitted because values in the lower triangular portion are set as if an upper triangular portion were folded back at a diagonal line (that is, Tij=Tji). Although this embodiment has been described on the case where Tij becomes equal to G (G>0) when there is a quotation relation but Tij becomes equal to zero when there is no quotation relation, the invention is not limited thereto.

Next, the process of active propagation in the control portion 11 will be described with reference to FIG. 12. First, the control portion 11 performs initialization such as selection of subjects to be computed (S1). The control portion 11 makes a user select a data element as a target data initially. A list of data elements having a quotation relation ("quoting" and "quoted" relation) to the target data selected by the user (in which the target data initially selected is referred to as "initial seed data") is read. Data elements listed in the data element list read thus and the initial seed data (i.e. a group of data elements adjacent to the initial seed data on the network defined between data elements) are used as subjects to be computed.

The control portion 11 initializes data values with respect to the data elements to initialize the element database. As a specific example of the initializing method, a predetermined initial value may be set in the initial seed data whereas zero is set in any other data element than the initial seed data.

Then, the control portion 11 selects one of M data elements to be computed as a target data on the basis of a predetermined rule (S2). For example, this rule (selection rule) is a rule of random selection. Assume now that the i-th data element is selected as a target data.

The control portion 11 computes an input stimulus value of the target data in accordance with the following expression 12 on the basis of the association weighting information between the target data and the data elements as subjects of computation (S3).

$$I_i = \sum_{j}^{M-1} T_{ij} Y_j \qquad \text{[Expression 12]}$$

In the expression 12, Tij is a value of association weighting between the i-th data element and the j-th data element and read from the association weighting database for use, and Yj is a data value stored in the element database while associated with the j-th data element.

Then, the data value associated with the i-th data element which is the target data is decided (S4) to update the element database. Specifically, decision of the data value in this embodiment is performed as follows.

That is, the stage value n indicating the stage at which the data value associated with the target data is present is examined among the plurality of stages. Because it is now assumed that the data value is changed by Ymax/N=ΔY each stage, the stage value n can be calculated as the quotient of the data value divided by ΔY (i.e. because of Y=n×ΔY, n can be calculated as the quotient of Y divided by ΔY). Then, a lower threshold θmin and an upper threshold θmax corresponding to the obtained stage are acquired.

The input stimulus value I computed in the step S3 is compared with the upper threshold θmax. In the case of I>θmax, the data value Y is updated to (n+1)×ΔY and the step S3 is executed recurrently. Incidentally, at the uppermost stage Y=Ymax, the upper threshold is set to be larger than the maximum input stimulus value so that the data value is prevented from becoming larger than the maximum. The lower threshold θmin is also compared with the input stimulus value I. In the case of I≦θmin, the data value Y is updated to (n−1)×ΔY and the step S3 is executed recurrently. Also in this case, at the lowermost stage Y=Ymin, the lower threshold is set to be smaller than the minimum input stimulus value so that the data value is prevented from becoming smaller than the minimum. In the case of θmin<I≦θmax, the control portion 11 goes to step S5.

The control portion 11 scales data values with respect to the data elements as subjects of computation so that the sum of the data values becomes equal to a predetermined value C (S5). That is, the following arithmetic operation is carried out with the i-th data value as Yi.

$$Y'_i = \frac{CY_i}{\sum_i Y_i} \qquad \text{[Expression 13]}$$

The data value Y'i is overwritten in place of the data value Yi and stored in the storage portion 12. Network convergence is improved by this scaling.

After the data value associated with the target data is updated and scaling is performed in this manner, a vector defined by a set of data values concerned with each data element is generated (S6).

$$\overline{O} = (O_1 O_2 \ldots O_N) \qquad \text{[Expression 14]}$$

When a vector previously generated is stored in the storage portion 12, the difference between the previously generated vector and the currently generated vector is calculated. A judgment is made as to whether a vector of the calculated difference is a zero vector (a vector having all elements of "0") or not, that is, whether the following expression is valid or not (S7).

$$\underbrace{(0, 0, \ldots, 0)}_{N} \qquad \text{[Expression 15]}$$

Incidentally, when the previously generated vector is different in the number of dimensions from the currently generated vector, the control portion 11 goes to step S8. When the difference vector is not a zero vector in the step S7 (in the case of No) though the two vectors are the same in the number of dimensions, the control portion 11 goes to the step S8 to enlarge subjects of computation (S8).

In the step S8, the control portion 11 additionally selects data elements as subjects of computation on the basis of the updated data value. A specific example of processing will be described below. The control portion 11 reads a list of data elements (listed as correspondent data elements) adjacent to the data element larger than a predetermined weighting threshold (e.g. "0") by referring to data values with respect to the other data elements than the initial seed data and included in the data elements as subjects of computation, and connects the read list of data elements to the current list of data elements as subjects of computation to thereby increase the number of data elements as subjects of computation. The term "connection" means connection except overlapping and is equivalent to so-called computation of the sum of a set.

Incidentally, the control portion 11 may control the connection so that the list is not connected when the number of data elements as subjects of computation will be larger than a predetermined maximum after the connection. As a result, the number of data elements as subjects of computation can be prevented from increasing infinitely.

After the enlargement of subjects of computation, the control portion 11 goes back to the step S2 to repeat processing. That is, after the data value is updated, a judgment is made as to whether data values concerned with the respective data elements are unchanged or not. While the data values are changed, the control portion 11 goes back to the step S2.

When the calculated difference vector is a zero vector in the step S7 (in the case of Yes), the process is terminated. A set of information for specifying data elements stored in the element database at this point of time and data values is provided as an analysis result to a predetermined post-process. Incidentally, the state of storage in the element database expresses an input-output balance state (so-called kinetic attractor) in individual data elements. This state is equivalent to a state called "fixed point".

In the computation in the step S4 described here, it is necessary to execute an arithmetic operation recurrently. This is because the data value may be changed by a plurality of stages. When the data value is changed by the plurality of stages in this manner, the computing speed is lowered if the number N of stages is increased because the control portion 11 repeats comparison between the threshold and the input stimulus value. Therefore, in this embodiment, data values are used as continuous values on the assumption of a limit state where N is infinitely great instead of the case where data values are separated into N stages discretely. Although the continuous values are expressed by discrete representation as the internal representation of the computer, they are called "continuous values" because of the theoretical meaning that they do not take stepwise values.

Figure 13:
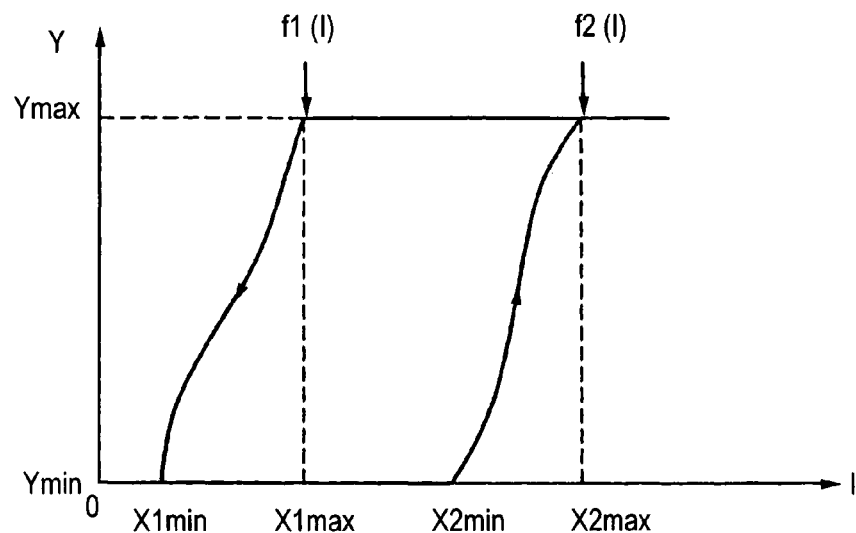
FIG. 13 is an explanatory view showing an example of the method for updating data values.
Figure 14:
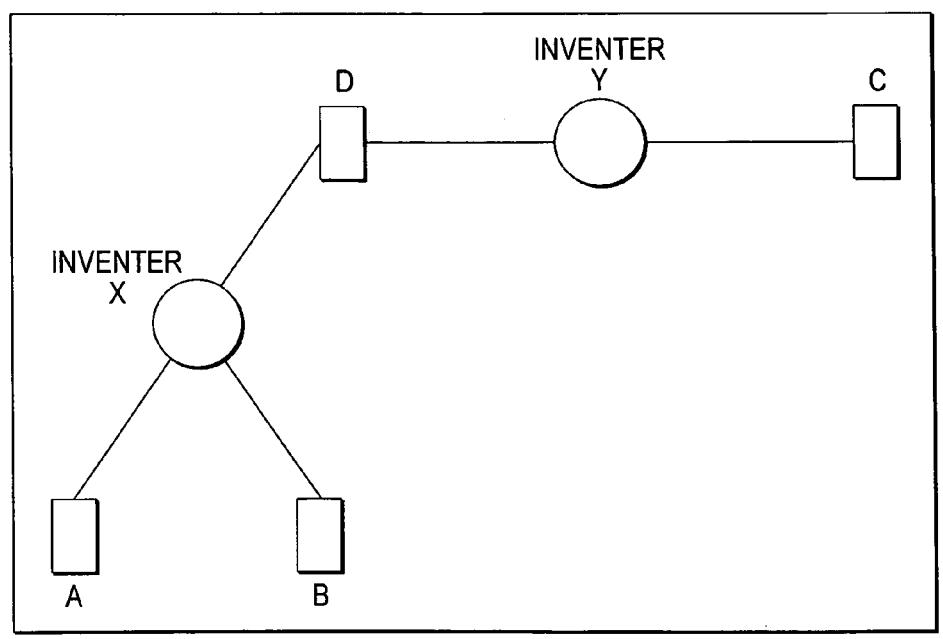
FIG. 14 is an explanatory view showing an example of the method for displaying data values.

When the data values are used as continuous values, as shown in FIG. 13, the data value is updated by use of a first monotonically increasing function f1 which takes Ymin in an input stimulus value range of from 0 to X1min, increases continuously monotonically in an input stimulus value range of from X1min to X1max and takes Ymax in an input stimulus value larger than X1max and a second monotonically increasing function f2 which increases continuously monotonically in an input stimulus value range of from X2min to X2max and takes Ymax in an input stimulus value larger than X2max. That is, (1) the data value Y is set to be equal to Ymax when the input stimulus value I for the target data is larger than X2max, that is, in the case of X2max<I;

(2) the data value Y is set to be equal to Ymin when the input stimulus value I for the target data is not larger than X1min, that is, in the case of I<X1min; and (3) when the input stimulus value I for the target data is in a range of from X1min to X2max, that is, in the case of X1min<I≦X2max, the data value is updated to f2 (I) when the input stimulus value I is larger than I2 by referring to I2 to satisfy Y=f2 (I2 with respect to the data value Y of the target data before updating, and the data value is updated to f1 (I) when the input stimulus value I is smaller than I1 by referring to I1 to satisfy Y=f1 (I1) with respect to the data value Y of the target data before updating.

The first and second monotonically increasing functions f1 and f2 are defined as follows.

$$Y=f_1(I)=\alpha(I-X_{1min})$$

$$Y=f_2(I)=\alpha(I-X_{2min})$$ [Expression 16]

In this case, solutions to I2 and I1 with respect to Y=f2 (I2) and Y=f2 (I1) are given as follows.

$$I = \frac{Y}{\alpha} + X_{1min}$$

$$I = \frac{Y}{\alpha} + X_{2min}$$ [Expression 17]

Accordingly, the data value is updated as follows. That is, (1) the data value Y is set to be equal to Ymax when the input stimulus value I for the target data is larger than X2max, that is, in the case of X2max<I;

(2) the data value Y is set to be equal to Ymin when the input stimulus value I for the target data is not larger than X1min, that is, in the case of I≦X1min; and (3) when input stimulus value I for the target data is in a range of from X1min to X2max, that is, in the case of X1min<I≦X2max, the data value is updated to f2(I)=α(I−X2min) when the input stimulus value I is larger than Y/α+X2min with respect to the data value Y of the target data before updating, and the data value is updated to f1(I)=α(I−X1min) when the input stimulus value I is smaller than Y/α+X1min with respect to the data value Y of the target data before updating.

According to this method, the number of times for judgment can be limited so that the quantity of calculation can be reduced.

Incidentally, in the above description, when, for example, a data element is an article, the article quotes a large number of other articles but the article has relatively high activity when the article is not quoted by other articles. Therefore, to avoid this problem, a coefficient concerned with the number of quoting articles and the number of quoted articles may be multiplied by the input stimulus value as represented by the following expression 18 instead of the expression 12.

$$I_i = \frac{k_i^{(in)}}{k_i^{(in)} + k_i^{(out)}} \sum_j^{M-1} T_{ij} Y_j$$ [Expression 18]

In the expression 18, $k_i^{(in)}$ is the total number of other data elements quoted by the article which is the i-th data element, and $k_i^{(out)}$ is the total number of other data elements quoting the article which is the i-th data element. That is, the coefficient is the rate of the number of other articles quoted by the article to the total number of quoting and quoted articles. This coefficient can be decided by referring to information for defining the network.

Next, the operation of the data analyzer according to this embodiment will be described. On the assumption that there is an article serving as a seed document, a process of retrieving other articles like the article from collected articles will be described as an example.

The control portion 11 extracts words satisfying a predetermined condition from words extracted from the article serving as the seed document. For example, the predetermined condition is that words specific to the article appear frequently in the article (so-called TFIDF method). The control portion 11 retrieves at least one article like the seed document from collected articles by using the words extracted from the seed document. This retrieval is executed by a keyword retrieval method known commonly or by a method using the frequency of occurrence of each word. Or articles found by the retrieval may be displayed so that at least one of the articles can be selected by the user.

Figure 12:
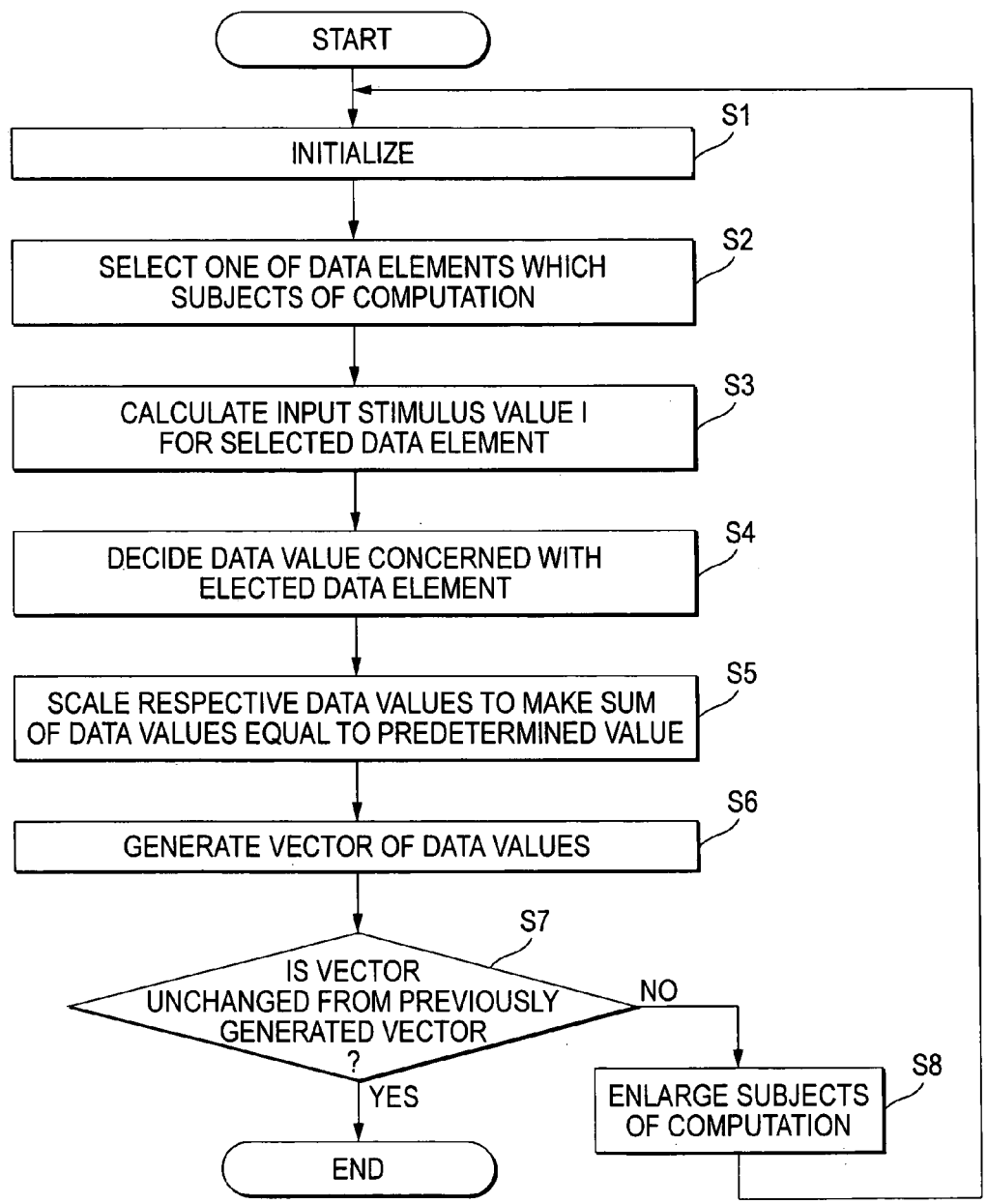
FIG. 12 is a flow chart showing an example of the process of active propagation.

The control portion 11 executes the process shown in FIG. 12 while the article found by the retrieval or selected from retrieved articles by the user is used as an initial seed data.

That is, while a group of articles having a quotation relation to the initial seed data are used as initial subjects of computation, a data value given to the initial seed data is propagated actively. After the active propagation, a group of articles having a quotation relation to data elements having data values larger than a predetermined weighting threshold are specified by referring to data values of respective data elements contained in the subjects of computation and are added to the subjects of computation to thereby enlarge the subjects of computation. The process of active propagation is further continued.

When the process of active propagation results in convergence, the control portion 11 lists articles as respective data elements in order of descending data value to present the articles to the user.

In this embodiment, to use such active propagation, solutions having continuity are given to the initial pattern state of the network which is formed from a group of data elements as subjects of analysis. For this reason, this network can be used for wide purposes compared with the network in which convergence is made to predetermined solutions discontinuously.

Moreover, in this embodiment, scaling of data values (normalization by dividing each data value by the sum of the data values and multiplying each quotient by a predetermined value C to make the sum equal to the predetermined value C) is performed in the process of active propagation to thereby improve convergence without spoiling the network structure. Incidentally, when a decision is made from the initial data values that convergence without scaling is higher than convergence with scaling, configuration may be made so that the user can select execution of scaling or non-execution of scaling. When the user selects non-execution of scaling, the control portion 11 goes to the step S6 after the step S4 without execution of the step S5 in the process shown in FIG. 12.

Moreover, in this embodiment, the scale of computation can be limited to lighten processing load because a method of limiting the subjects of computation by the predetermined network structure and enlarging the subjects of computation by active propagation is used.

Although only the direction of enlargement of the subjects of computation is shown here, data elements having data values smaller than the predetermined lower threshold in the process of active propagation may be removed from the subjects of computation. In this case, data elements missing the link to the remaining network after removal of the data elements (i.e. other data elements connected to the network through the removed data elements) may be removed from the subjects of computation.

Incidentally, although this embodiment has been described on the case where the network structure is defined on the basis of a quotation relation when data elements are articles, the network structure may be defined on the basis of the identity of authors (whether the same author is contained or not), the frequency of occurrence of each word, the log of access to the collected articles (whether there is a possibility or not that the collected articles are accessed at the same time), and so on.

The association weighting values may be also decided on the basis of the identity of authors, the frequency of occurrence of each word, the access log, and so on.

Moreover, the network may be formed as follows.

(1) Network Between Web Pages

In the case of documents linked to one another such as Web pages, the link relation may be used as the network structure directly.

(2) Relation Between Authors

Links may be set between articles of the same author to define a network. When, for example, there is an author X of documents A and B and an author Y of documents A and C (the authors X and Y are coauthors of the document A), a network having links between the documents A and B and between the documents A and C is formed.

(3) Coauthor Relation

Moreover, in the aforementioned case, authors may be used as data elements so that links can be set between coauthors to define the network. In the aforementioned case, a network having links between the authors X and Y is formed because the authors X and Y are coauthors of the document A.

(4) Relation Between Author and Document

Data elements contained in the network are not always of the same kind. For example, data elements of authors may be linked to data elements of documents on the basis of relations of writing. When, for example, the author X is an author of documents A and B and the author Y is an author of documents A and C as described above, links are set between the data element of the author X and the data element of the document A (hereinafter referred to as "between author X and document A" simply), between author X and document B, between author Y and document A and between author Y and document C, respectively. In this case, documents A and B are not directly linked to each other but connected to each other through author X.

(5) Access History

Links may be set between documents used by users in accordance with the users to define the network. When, for example, there is an access history indicating the fact that documents A and B were accessed by a user X, links are set between the data element of the document A and the data element of the document B.

(6) Access to Common Document

Links may be set between users making access to a common document to thereby define the network. When, for example, a user X makes access to documents A and B while a user Y makes access to documents A and C, links are set between the users X and Y to form the network because access to the same document A was recorded.

(7) Links may be set between users and documents accessed by the users in accordance with the users to define the network. When, for example, there is an access history indicating the fact that documents A and B were accessed by a user X, links are set between the data element of the user X and the data element of the document A and between the data element of the user X and the data element of the document B.

(8) Application Document Network

Moreover, when the inventor X is an inventor of patent application documents A and B, a link may be set between the patent application documents A and B to form a network of patent application documents.

(9) Co-Inventor Network

A link may be also set between co-inventors to form a network of inventors. That is, when inventors X and Y are co-inventors of an invention A, a link is set between data elements expressing the inventors X and Y respectively.

(10) Inventor-Application Network

Moreover, links may be set between inventors and patent applications. When, for example, the inventor X is an inventor of patent applications A and B, links are set between the data element of the inventor X and the patent application document A and between the data element of the inventor X and the patent application document B, respectively. When, for example, Y is a co-inventor of the invention according to the patent application document A, the inventors X and Y are not directly linked to each other but connected to each other through the data element of the patent application document A.

As described above, these networks may be presented in order of descending data value. Or after active propagation is converged, a relative distance between data elements may be decided on the basis of data values so that graphic elements (e.g. rectangle, circle, etc.) expressing the data elements respectively are disposed so as to be far by a distance corresponding to the decided relative distance and displayed. Moreover, data elements linked to each other may be displayed so as to be connected to each other by a line segment. Moreover, when, for example, data elements different in kind such as "inventor" and "patent application document" are contained, the different kinds of data elements may be displayed by different graphic elements respectively. Specifically, the display is as shown in FIG. 8. According to the display, for example, patent application documents or inventors large in data value are disposed close to each other. From this, for example, information indicating the kind of human relation between techniques can be analyzed. In addition, display may be performed while the color depths of graphic elements are changed according to the data values.

The entire disclosures of Japanese Patent Application No. 2004-318884 5 filed on Nov. 2, 2004, Japanese Patent Application No. 2005-044725 filed on Feb. 21, 2005 and Japanese Patent Application No. 2005-054502 filed on Feb. 218, 2005 including specifications, claims, drawings and abstracts are incorporated herein by reference in their entirety.

What is claimed is:

1. A data analyzer that executes data analysis using a "Spreading Activation Theory" method, the data analyzer comprising:

a computer-readable storage unit that stores data values at any one of N stages (N is an integer not smaller than 2) while associating the data values with a plurality of data elements respectively and stores association weighting information among the data elements, the data elements being selected using a stemming process;

a selecting and computing unit that selects one of the data elements as a target data on the basis of a predetermined rule and computes an input stimulus value concerned with the target data on the basis of the association weighting information between the target data and the other data elements and the data values of the other data elements; and an updating unit that updates the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed, wherein after repeating execution of computing of the input stimulus value and updating of the data value until satisfaction of a predetermined condition, the data value concerned with at least one of the data elements is subjected to a predetermined process.

2. A data analyzer that executes data analysis using a "Spreading Activation Theory" method, the data analyzer comprising:

a computer-readable storage unit that stores data values as continuous values in a range of from Ymin to Ymax (Ymin<Ymax) while associating the data values with a plurality of data elements respectively and stores association weighting information among the data elements, the data elements being selected using a stemming process;

a selecting and computing unit that selects one of the data elements as a target data on the basis of a predetermined rule and computes an input stimulus value concerned with the target data on the basis of the association weighting information between the target data and the other data elements and the data values of the other data elements; and an updating unit that updates the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed, wherein after repeating execution of computing of the input stimulus value and updating of the data value until satisfaction of a predetermined condition, the data value concerned with at least one of the data elements is subjected to a predetermined process.

3. The data analyzer according to claim 2, wherein the updating unit uses a first monotonically increasing function f1 which takes Ymin when the input stimulus value is in a range of from 0 to X1min, which increases continuously monotonically when the input stimulus value is in a range of from X1min to X1max and which takes Ymax when the input stimulus value is not smaller than X1max, and a second monotonically increasing function f2 which increases continuously monotonically when the input stimulus value is in a range of from X2min to X2max and which takes Ymax when the input stimulus value is not smaller than X2max, while the input stimulus value with respect to the target data is in a range of from X1min to X2max, the data value updating means updates the data value to f2(I) by referring to I2 satisfying Y=f2(I2) with respect to the data value Y of the target data before updating, when the input stimulus value I is larger than I2, and the data value updating means updates the data value to f1(I) by referring to I1 satisfying Y=f1(I1) with respect to the data value Y of the target data before updating, when the input stimulus value I is smaller than I1.

4. The data analyzer according to claim 2, further comprising:

a scaling unit that scales data values with respect to the data elements so that the sum of the data values becomes equal to a predetermined value.

5. The data analyzer according to claim 4, wherein the updating unit uses a first monotonically increasing function f1 which takes Ymin in an input stimulus value range of from 0 to X1min, continuously monotonically increases in an input stimulus value range of from X1min to X1max and takes Ymax in an input stimulus value range of not smaller than X1max, and a second monotonically increasing function f2 which continuously monotonically increases in an input stimulus value range of from X2 min to X2max and takes Ymax in an input stimulus value range of not smaller than X2max, while the input stimulus value for the target data is in a range of from X1min to X2max, the data value updating means updates the data value to f2(I) when the input stimulus value I is larger than I2 by referring to I2 to satisfy Y=f2(I2) with respect to the data value Y of the target data before updating, and the data value updating means updates the data value to f1(I) when the input stimulus value I is smaller than I1 by referring to I1 to satisfy Y=f1(I1) with respect to the data value Y of the target data before updating.

6. A data analyzing method using a computer having a computer-readable storage unit that executes data analysis using a "Spreading Activation Theory" method and that stores data values as discrete or continuous values at a plurality of stages while associating the data values with a plurality of data elements respectively and stores association weighting information among the data elements, the data elements being selected using a stemming process, the method comprising the steps of:

selecting one of the data elements as a target data on the basis of a predetermined rule and computing an input stimulus value concerned with the target data on the basis of the association weighting information between the target data and the other data elements and the data values of the other data elements;

updating the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed; and storing the updated data value on the computer-readable storage unit or outputting the updated data value to a display, wherein the steps are repeatedly executed until a predetermined condition is satisfied, and after the repeated execution, the data value concerned with at least one of the data elements is subjected to a predetermined process.

7. The data analyzing method according to claim 6, further comprising the step of:

scaling data values with respect to the data elements so that the sum of the data values becomes equal to a predetermined value.

8. A storage medium readable by a computer, the storage medium storing a program of instructions executable by the computer having a storage unit that executes data analysis using a "Spreading Activation Theory" method and that stores data values as discrete or continuous values at a plurality of stages while associating the data values with a plurality of data elements respectively and stores association weighting information among the data elements, the data elements being selected using a stemming process, the function comprising the steps of:
  selecting one of the data elements as a target data on the basis of a predetermined rule and computing an input stimulus value concerned with the target data on the basis of the association weighting information between the target data and the other data elements and the data values of the other data elements;
  updating the data value of the target data on the basis of the computed input stimulus value in such a manner that a threshold decided in accordance with a current data value associated with the target data and varying according to each data value is compared with the input stimulus value to determine whether the data value needs to be changed or not, and that the data value is updated when a decision is made that the data value needs to be changed; and
  storing the updated data value on the storage medium or outputting the updated data value to a display.

9. The storage medium according to claim 8, wherein the function further comprising the step of:
  scaling data values with respect to the data elements so that the sum of the data values becomes equal to a predetermined value.

10. A data analyzer that executes data analysis using a "Spreading Activation Theory" method, the data analyzer comprising:
  a computer-readable storage unit that stores data values as continuous values in a range of from Ymin to Ymax (Ymin<Ymax) while associating the data values with at least a part of data elements respectively and stores association weighting information among the data elements the data elements being selected using a stemming process;
  a selecting unit that selects at least one of the data elements as a seed and selects the seed and at least one of the other data elements different from the seed as subjects of computation;
  a selecting and computing unit that selects one of the selected subjects of computation as a target data on the basis of a predetermined rule and computes an input stimulus value concerned with the target data on the basis of information of association weighting between the target data and the data elements selected as the subjects of computation and the respective data values of the data elements selected as the subjects of computation; and
  an updating unit that updates the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed,
  wherein after repeated execution of computing of the input stimulus value and updating of the data value until satisfaction of a predetermined condition, the data value concerned with at least one of the data elements is subjected to a predetermined process.

11. The data analyzer according to claim 10, further comprising:
  an additionally selecting unit that additionally selects data elements as subjects of computation on the basis of the data value updated by the updating unit.

12. The data analyzer according to claim 10, wherein
  the updating unit uses a first monotonically increasing function f1 which takes Ymin when the input stimulus value is in a range of from 0 to X1min, which increases continuously monotonically when the input stimulus value is in a range of from X1min to X1max and which takes Ymax when the input stimulus value is not smaller than X1max, and a second monotonically increasing function f2 which increases continuously monotonically when the input stimulus value is in a range of from X2 min to X2max and which takes Ymax when the input stimulus value is not smaller than X2max,
  while the input stimulus value with respect to the target data is in a range of from X1min to X2max,
  the data value updating means updates the data value to f2(I) by referring to I2 satisfying Y=f2(I2) with respect to the data value Y of the target data before updating, when the input stimulus value I is larger than I2, and
  the data value updating means updates the data value to f1(I) by referring to I1 satisfying Y=f1(I1) with respect to the data value Y of the target data before updating, when the input stimulus value I is smaller than I1.

13. The data analyzer according to claim 10, wherein the updating unit scales the data values with respect to data elements so that the sum of the data values becomes equal to a predetermined value when the data value is updated.

14. A data analyzing method using a computer having a computer-readable storage unit that executes data analysis using a "Spreading Activation Theory" method and that stores data values as continuous values in a range of from Ymin to Ymax (Ymin<Ymax) while associating the data values with at least a part of data elements respectively and stores association weighting information among the data elements, the data elements being selected using a stemming process, the method comprising the steps of:
  selecting at least one of the data elements as a seed and selecting the seed and at least one of the other data elements different from the seed as subjects of computation;
  selecting one of the selected subjects of computation as a target data on the basis of a predetermined rule and computing an input stimulus value concerned with the target data on the basis of information of association weighting between the target data and the data elements selected as the subjects of computation and the respective data values of the data elements selected as the subjects of computation; and
  updating the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed,
  wherein after repeated execution of computing of the input stimulus value and updating of the data value until satisfaction of a predetermined condition, the data value is output to a display or stored on the computer-readable storage unit.

15. A storage medium readable by a computer, the storage medium storing a program of instructions executable by the computer having a storage unit that executes data analysis using a "Spreading Activation Theory" method and that stores data values as continuous values in a range of from Ymin to Ymax (Ymin<Ymax) while associating the data values with at least a part of data elements respectively and stores association weighting information among the data elements, the data elements being selected using a stemming process, the function comprising the steps of:

selecting at least one of the data elements as a seed and selecting the seed and at least one of the other data elements different from the seed as subjects of computation;

selecting one of the selected subjects of computation as a target data on the basis of a predetermined rule and computing an input stimulus value concerned with the target data on the basis of association weighting information between the target data and the data elements selected as the subjects of computation and the respective data values of the data elements selected as the subjects of computation;

updating the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed; and storing the updated data value on the storage medium or outputting the updated data value to a display, wherein computing of the input stimulus value and updating of the data value are repeatedly executed until satisfaction of a predetermined condition.

16. A data analyzer that executes data analysis using a "Spreading Activation Theory" method, the data analyzer comprising:

a computer-readable storage unit that stores data values while associating the data values with at least a part of data elements respectively and stores association weighting information among the data elements;

a selecting and computing unit that selects one of the data elements as a target data on the basis of a predetermined rule and computes an input stimulus value concerned with the target data on the basis of association weighting information among the target data and the data elements selected as the subjects of computation and the respective data values of the data elements selected as the subjects of computation; and an updating unit that updates the data value of the target data on the basis of the computed input stimulus value in such a manner that a threshold decided in accordance with the current data value associated with the target data and different in accordance with the data value is compared with the input stimulus value to decide whether the data value is to be changed or not, and that the data value is updated when a decision is made that the data value is to be changed, wherein after repeated execution of computing of the input stimulus value and updating of the data value until satisfaction of a predetermined condition, a relative distance between data elements is decided on the basis of the data value concerned with at least one of the data elements so that graphic elements corresponding to the data elements respectively are arranged so as to be separate by the decided relative distance and displayed.

* * * * *